United States Patent [19]

Liu et al.

[11] Patent Number: 4,772,118

[45] Date of Patent: Sep. 20, 1988

[54] METHODS OF AND APPARATUS FOR MEASURING PICOSECOND SEMICONDUCTOR LASER PULSE DURATION USING THE INTERNALLY GENERATED SECOND HARMONIC EMISSION ACCOMPANYING THE LASER OUTPUT

[75] Inventors: Jia M. Liu, Arlington, Mass.; Ying C. Chen, Closter, N.J.

[73] Assignee: GTE Laboratories Incorporated, Waltham, Mass.

[21] Appl. No.: 884,848

[22] Filed: Jul. 14, 1986

[51] Int. Cl.$^4$ .............................................. G01J 1/00
[52] U.S. Cl. ..................................... 356/121; 356/213
[58] Field of Search ....................... 356/345, 121, 213; 307/425, 427; 364/728

[56] References Cited

U.S. PATENT DOCUMENTS

| | | | |
|---|---|---|---|
| 2,382,439 | 8/1945 | Osborn | 356/416 X |
| 4,303,840 | 12/1981 | Bjorkholm | 307/427 |
| 4,320,462 | 3/1982 | Lund et al. | 356/121 X |
| 4,406,542 | 9/1983 | Boggy | 356/345 |
| 4,413,905 | 11/1983 | Holzapfel | 307/425 X |

OTHER PUBLICATIONS

Takao Furuse and Isamu Sakuma, Internal Second Harmonic Generation in GaAsPDH Lasers, 12-80, pp. 413-415.
Optics Communications vol. 35, #3.
D. A. Angelov, G. G. Gurzadyan, D. N. Nikogosyn, Generation of high-power Picosecond Pulses of 218-316 nm Wavelengths, Oct. 1979, 1334-5 Sov. I. Quantum 9(10).
J. Wiedmann et al., Determination of the Shape and Duration of Picosecond Light Pulses by Bleaching of Dyes, Jul.-79, 107-112, Optics Communications vol. 30, #1.

Primary Examiner—R. A. Rosenberger
Assistant Examiner—Steve McGowan
Attorney, Agent, or Firm—Fred Fisher

[57] ABSTRACT

The duration of a very short semiconductor laser pulse, such as that ranging from a fraction to hundreds to picoseconds, can be measured utilizing the internally generated second harmonic emission of the laser. A laser diode is driven so that light emitted therefrom can pass through a beam splitter and be reflected by the beam-splitter into a photomultiplier and into a detector, respectively. Signals received therefrom relate to the conversion efficiency of the second harmonic emission generated by the picosecond pulses and of either continuous wave emission or pulse emission whose durations can be accurately measured by photodetectors. Apparatus includes a photodiode for measuring the fundamental laser power, a photomultiplier for measuring the second harmonic power, and appropriate filters. Ammeters coupled to the photodiode and photomultiplier measure the appropriate current. The ratio of the current can be determined by a ratio circuit or a computer.

9 Claims, 2 Drawing Sheets

METHODS OF AND APPARATUS FOR MEASURING PICOSECOND SEMICONDUCTOR LASER PULSE DURATION USING THE INTERNALLY GENERATED SECOND HARMONIC EMISSION ACCOMPANYING THE LASER OUTPUT

BACKGROUND OF THE INVENTION

1. Field of the Invention

This invention relates to methods of and apparatus for measurement of picosecond semiconductor laser pulse duration using the internally generated second harmonic emission accompanying the laser output. Accordingly, it is a general object of this invention to provide new and improved methods and apparatus of such character.

2. General Background

We note that, in order to achieve high accuracy, background subtraction for the fundamental power and appropriate choice of reference signal may be necessary. Ideally, a pulse goes from about 0, to a maximum, down to about 0 again. In actuality, however, the pulse does not go from 0 to a maximum to 0, but instead goes to some background level—a dc level. That dc level should be subtracted in calculations. That subtracted amount is termed "background subtraction". In the present invention, $P_\omega$ for the picosecond pulses is the total average power without background subtraction, because the ratio between the energy contained in the pulses and the background is very high (greater than 20 to 1). This high contrast ratio is attributed to the index-guided laser structure and low threshold current. This ratio, however, is much lower for pulses generated from the gain-guided lasers with high threshold current, as described by P. L. Liu, C. Lin, I. P. Kaminow and J. J. Hsieh, IEEE. J. Quantam, Electron, QE-17, 671 (1981). In those cases, the background energy needs to be subtracted from $P_\omega$.

The efficiency of second harmonic generation depends on the number of longitudinal modes in the lasing spectra. If the fundamental power I is equally distributed over N longitudinal modes, the second harmonic power is proportional to $(2-N^{-1})I^2$, as described by N. Bloembergen, Nonlinear Optics, (W. A. Benjamin, Inc., Reading, Mass., 1965).

There have been several reports on the properties of the second harmonic emission in gallium arsenide and in InGaAsP lasers as shown by L. D. Malmstrom, J. J. Schlikman and R. H. Kingston, J. Appl. Phys., 35 248 (1964) and by T. Furuse and I. Sakuma, Opt. Commun. 35, 413 (1980) In conventional semiconductor lasers, the epitaxial layers are grown in the (100) plane and the cleaved facets are in the (110) plane. The symmetry of the laser materials requires that the TE laser emission, the normal operating mode, generates second harmonic emission, polarized in the direction normal to the junction plane, while the TM laser emission generates no second harmonic emission.

Ultrashort optical pulse generation with semiconductors lasers is of interest for such applications as high bit rate optical communications and very fast data processing. In the picosecond regime, the most commonly used technique of pulse duration measurement has been the nonlinear intensity autocorrelation technique involving phase-matched second harmonic generation in a nonlinear optical crystal, such as a LiIO$_3$ crystal.

In general, intensity autocorrelation is well-known. The intensity autocorrelation technique involves the provision of a very sharp pulse, such as a picosecond pulse, splitting it in half, delaying one half of the split pulse while not delaying the other, then combining the two pulses. The pulses are combined and passed through a nonlinear crystal to generate second harmonics. The intensity of the second harmonics is higher when the two pulses overlap. By delaying one pulse, relative to the other, an overlap can occur. The delay is physically measured. If the delay is, for example, one centimeter, the time duration can be calculated since it is known that the speed of light can travel one centimeter in 30 picoseconds, approximately.

SUMMARY OF THE INVENTION

Another object of this invention is to provide for new and improved methods and apparatus for picosecond semiconductor laser pulse duration measurement in which its simplicity and accuracy can be very useful for practical applications.

Yet another object of this invention is to provide for new and improved picosecond semiconductor laser pulse duration measurement which does not require critical optical alignment.

In accordance with one aspect of the invention, the method of measuring the duration of a very short width semiconductor laser pulse, using internally generated second harmonic emission accompanying the laser pulse, includes the steps of driving a semiconductor laser so as to provide a very short width light pulse of a certain maximum amplitude. The light pulse has a duration ranging from a fraction of a picosecond to hundreds of picoseconds. The light pulse is collimated and directed along a first path. The collimated light pulse is split into two beam pulses. One of the beam pulses has TE laser emission, the normal operating mode. The other of the beam pulses has the second harmonic emission. The power of the second harmonic emission is compared with that of a reference signal of known duration, thereby determining the duration of the light pulse. In accordance with certain features of the invention, the light pulse has a certain maximum amplitude A and minimum amplitude zero, wherein the duration of the light pulse is measured at amplitude one-half A. The light pulse can have a certain maximum amplitude A and a background amplitude B, wherein the duration of the light pulse is measured at one-half the amplitude $(A-B)$. The light pulse can be provided by driving a diode laser, wherein the duration can be in the range from one picosecond to hundreds of picoseconds.

In accordance with another aspect of the invention, apparatus for measuring the duration of a very short width semiconductor laser pulse, using internally generated second harmonic emission accompanying the laser pulse, includes means for receiving a semiconductor laser. Means are coupled to the receiving means for driving the semiconductor laser so as to provide a very short width light pulse of a certain maximum amplitude. The light pulse has a duration ranging from a fraction of a picosecond to hundreds of picoseconds. A first lens means collimates the light pulse and directs the light pulse along a first path. Harmonic beam splitting means split the collimated light pulse into two beam pulses. One of the beam pulses has TE laser emission, the normal operating mode. The other of the beam pulses has the second harmonic emission. The one beam pulse traverses a second path. The other beam pulse traverses a third path. A first filter in the second path passes the second harmonic emission from the one beam pulse. A second filter in the third path passes laser emission from the other beam pulse. Photomultiplier means measure the second harmonic emission from the one beam pulse. Photodiode means measure fundamental power of the laser from the other beam pulse. In accordance with certain features of the invention, the apparatus can further include the semiconductor laser. It can further comprise a second lens means oriented along the second path for focusing the one beam pulse with respect to the photomultiplier means. A third lens means can be oriented along the third path for focusing the second beam pulse with respect to the photodiode means. The apparatus can be such wherein the photodetector means provides a first output X indicative of the second harmonic emission of the one beam pulse and photodiode means can provide a second output Y indicative of the fundamental power of the laser pulse. The apparatus can further comprise means coupled to the first output X and the second output Y for providing a function (KX/Y2) indicative of the duration of the very short width semiconductor laser pulse, wherein K is a constant.

BRIEF DESCRIPTION OF THE DRAWINGS

Other objects, advantages and features of this invention, together with its construction and mode of operation, will be become more apparent from the following description, when read in conjunction with the accompanying drawings, in which.

DESCRIPTION OF PREFERRED EMBODIMENTS

Figure 1A:
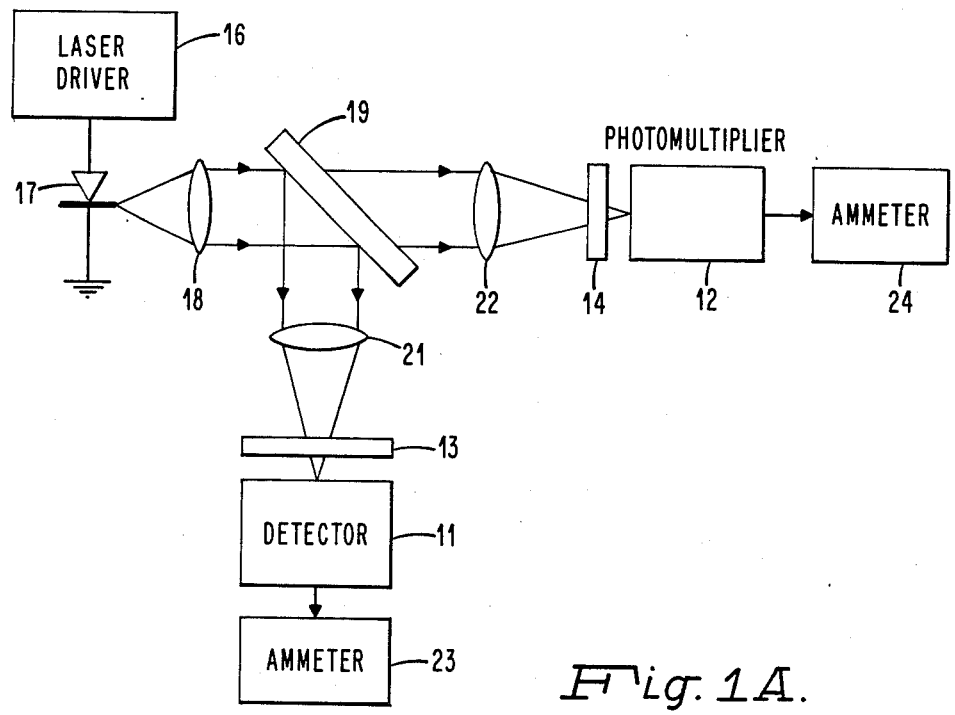
FIGS. 1a and 1b illustrate schematically two emodiments of the invention.
Figure 1B:
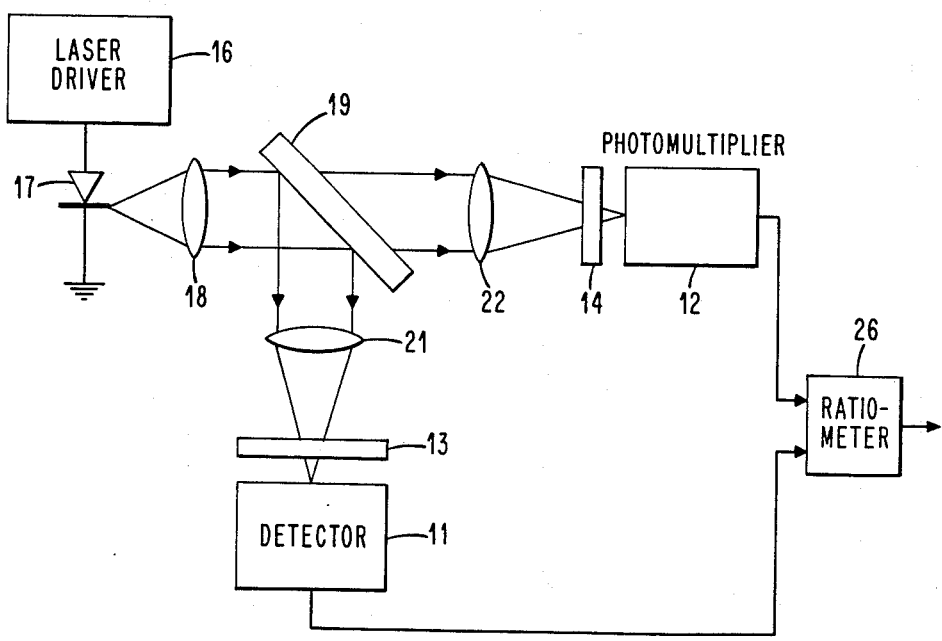

The picosecond pulse duration is determined by the ratio of the conversion efficiencies of the second harmonic emission generated by the picosecond pulses and of the CW emission or pulsed emission whose durations can be accurately measured by photodetectors. Referring to FIGS. 1a and 1b, the apparatus includes a photodiode 11 for measuring the fundamental laser power, a photomultiplier 12 for measuring the second harmonic power, and appropriate filters 13, 14, respectively. As stated earlier, no critical optical alignment is required.

A laser driver 16 drives a laser diode 17. Light from the laser diode 17 is directed through a collimating lens 18 to a beam splitter 19. The beam splitter 19 reflects the TE laser emission pass the focusing lens 21 directed through the filter 13 to the photodiode detector 11 which can be, for example, a Ge PIN photodiode. The beamsplitter 19 passes TM emission through another focusing lens 22 which TM emission is directed through the filter 14 to the photomultiplier 12.

As the power of the second harmonic emission is proportional to the square of the peak laser power, according to Bloembergen, supra, at a given average laser power the second harmonic emission is much stronger when the laser is operated pulsed than CW. By comparing the power of the second harmonic emission generated by the picosecond pulses with that generated by the reference signal (which can be the CW emission or other pulsed emission with known pulse duration), the duration of the picosecond pulses can be determined. Assuming that the picosecond pulses have a Gaussian pulse shape, given by the value $e^{-t^2/\tau^2}$ with a repetition rate R, the full width at half maximum (FWHM) value of pulse duration $\Delta t_{FWHM}$ is given by $\Delta t_{FWHM} = 0.662 \times D_{reference} (\bar{P}_{2\omega}\bar{P}^2_\omega)_{reference}/R(\bar{P}_{2\omega}/\bar{P}^2_\omega)_{picosecond}$ where $D_{reference}$ is the duty cycle of the reference signal, and $(\bar{P}_{2\omega}/\bar{P}^2_\omega)_{reference}$ and $(\bar{P}_{2\omega}/\bar{P}^2_\omega)_{picosecond}$ are the ratios of the average second harmonic power and the square of the average fundamental power of the reference signal and the picosecond pulses, respectively. The foregoing equation is derived under the assumptions that the efficiencies of second harmonic generation for the reference signal and the picosecond pulses are independent of the lasing spectra and that the picosecond pulses have no background. Conditions deviating from these assumptions may cause errors and will be discussed hereinafter.

The apparatus is schematically shown in FIGS. 1a and 1b. The lasers 17 that have been used successfully in this invention have been InGaAsP/InP planar active layer buried-heterostructure lasers emitting at 1.3-micron wavelength. Threshold currents have been typically 20 mA. The picosecond laser pulses were generated by driving the lasers 17 directly, without bias, with 100 MHz repetition rate, 80 picosecond duration electrical pulses from a comb generator. (A comb generator, typically, is a diode type circuit which converts a sinusoidal signal into spike pulses at the same frequency.)

Reference signals can be provided by operating the laser 17 in the CW mode and in square pulses mode with various pulse durations ranging from 5 nanoseconds to 100 nanoseconds. The duration of the reference pulses can be accurately measured using a high-speed photodiode and a sampling oscilloscope. The average power of the TE laser emission is detected by a Ge PIN photodiode 11. The average power of the second harmonic emission is detected by a Hamamatsu R955 photomultiplier 12. The photo current from both detectors 11, 12 can be displayed on ammeters 23, 24, respectively, as depicted in FIG. 1a. Alternatively, as depicted in FIG. 1b, the outputs of the detector 11 and the photomultiplier 12 can be fed to a ratio meter 26. The filter 14, in front of the photomultiplier 12, acts as a short pass filter to block the laser light so that the photomultiplier 12 has residual response to the intense 1.3-micron wavelength emission.

In general, the equation referred to above can be described generally as $$\Delta t_{FWHM} = A \frac{D_{reference} (\bar{P}_{2\omega}/\bar{P}_\omega^2)_{reference}}{R(\bar{P}_{2\omega}/\bar{P}_\omega^2)_{picosecond\ pulses}}$$

where A, a shape dependent factor, is 0.662 for a Gaussian pulse shape.

Figure 2:
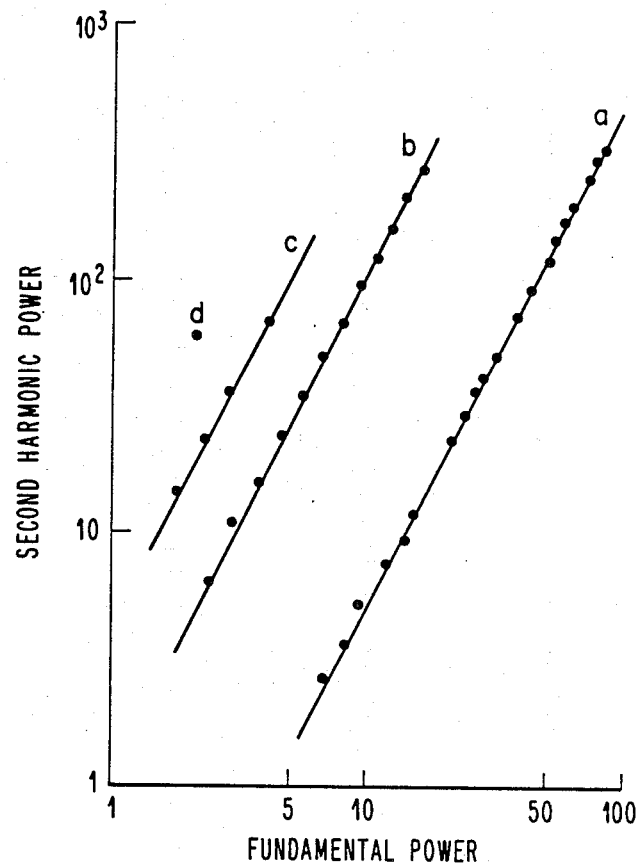
FIG. 2 is a chart showing the average second harmonic power versus the average fundamental power plotted on a log-log scale for (a) the CW emission, (b) 40 nanoseconds pulse duration, 4% duty cycle reference signals and (c) 10 nanoseconds pulse duration, 1% duty cycle reference signals.
Figure 3:
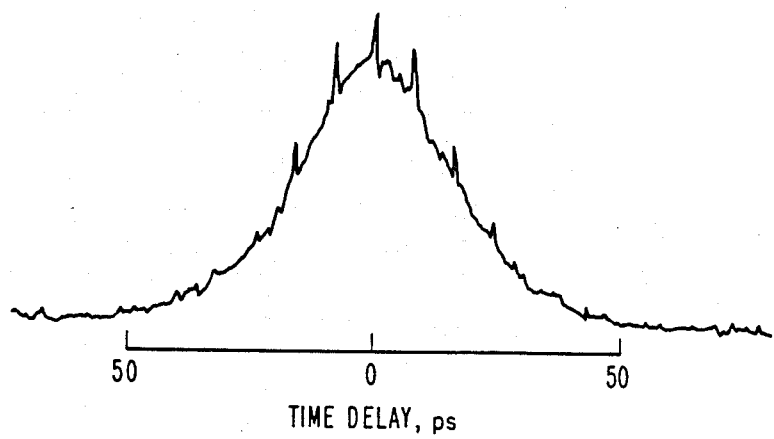
FIG. 3 is a chart indicating an autocorrelation trace of a pulse suitable for understanding the concept of this invention.

Referring to FIG. 2, the graph lines are slope-two lines drawn through the data points. The nearly perfect slope-two relationship between the second harmonic and the fundamental powers over a wide range of power reflects very good laser beam stability essential for the accuracy of the pulse duration measurement. Point d corresponds to the 100 MHz repetition rate, picosecond pulses whose durations are to be determined. Utilizing the above equation and the values of $(P_{2\omega}/P^{2\omega})_{reference}$ and $(P_{2\omega}/P^2_\omega)_{picosecond}$ from the chart shown in FIG. 2, the duration, $\Delta t_{FWHM}$ is 23.5 picoseconds based on the line a, 20 picoseconds based on the line b, and 21 picoseconds based on the line c. Using the same Gaussian pulse shape, the pulse duration deduced from the pulse shown in FIG. 3 is 22 picoseconds. The values determined by the internal second harmonic emission are in close agreement with that determined by the autocorrelation technique.

The sensitivity to the choice of the reference signal disappears when $N=1$ or when $N>>1$. The $N=1$ case corresponds to the dynamic single mode lasers, such as the distributed feedback lasers, whose lasing spectra are always single mode. The InGaAsP/InP lasers used in our reduction of practice belong to the $N>>1$ case. The lasing spectra contains four modes under CW operation at 5mW, and over 10 modes under the picosecond pulsed operation. In general, when the laser operates in many longitudinal modes under picosecond pulsed operation, the use of multimode reference signals, such as square pulses with durations in the nanosecond range, can eliminate potential errors due to the spectral dependence of the second harmonic generation efficiency.

Other modifications may be performed without departing from the scope and spirit of this invention. For example, as indicated above, the value of A is equal to 0.662 for a Gaussian pulse shape. However, when a symmetric two-sided exponential pulse shape is used, the value of A is 0.35. Similarly, the values of $\Delta t_{FWHM}$ would be different for symmetric two-sided exponential pulse shapes.

By the use of the term "picosecond semiconductor laser pulse duration" hereinabove, the term "picosecond pulses" as used is defined to mean very small pulses, that is, pulses that range in duration from a fraction of a picosecond to hundreds of picoseconds.

What is claimed is:

1. A method of measuring the duration of a very short width semiconductor laser pulse, using internally generated second harmonic emission accompanying the laser pulse, comprising the steps of
    driving a semiconductor laser so as to provide a very short width light pulse of a certain maximum amplitude, said light pulse having a duration ranging from a fraction of a picosecond to hundreds of picoseconds;
    collimating said light pulse and directing said light pulse along a first path;
    splitting the collimated light pulse into two beam pulses,
        one of said beam pulses having TE laser emission, the normal operating mode,
        the other of said beam pulses having the second harmonic emission; and
    comparing the power of the second harmonic emission of said one beam pulse with the power of a reference signal of known duration, thereby determining the duration of said light pulse.

2. The method as recited in claim 1 wherein said light pulse has a certain maximum amplitude A and minimum amplitude zero, and wherein said duration of said light pulse is measured at amplitude A/2.

3. The method as recited in claim 1 wherein said light pulse has a certain maximum amplitude A and a background amplitude B, and wherein said duration of said light pulse is measured at amplitude $(A-B)/2$.

4. The method as recited in claim 1 wherein said light pulse is provided by driving a diode laser.

5. The method as recited in claim 1 wherein said duration is in the neighborhood of one picosecond.

6. Apparatus for measuring the duration of a very short width semiconductor laser pulse, using internally generated second harmonic emission accompanying the laser pulse, comprising
    means for receiving a semiconductor laser:
    means coupled to said receiving means for driving said semiconductor laser so as to provide a very short width light pulse of a certain maximum amplitude, said light pulse having a duration ranging from a fraction of a picosecond to hundreds of picoseconds;
    a first lens means for collimating said light pulse and for directing said light pulse along a first path;
    beamsplitting means for splitting the collimated light pulse into two beam pulses,
        one of said beam pulses having TE laser emission, the normal operating mode, and
        the other of said beam pulses having the second harmonic emission,
    said one beam pulse traversing a second path, and said other beam pulse traversing a third path,
    a first filter in said second path for passing said second harmonic emission from said one beam pulse;
    a second filter in said third path for passing laser emission from said other beam pulse;
    photomultiplier means for measuring the second harmonic emission power from said one beam pulse;
    photodiode means for measuring fundamental power of said laser from said other beam pulse; and
    comparison means to compare the power of the second harmonic with the power of the fundamental in order to determine the duration of said light pulse.

7. The apparatus as recited in claim 6 further comprising said semiconductor laser.

8. The apparatus as recited in claim 6 further comprising
    a second lens means oriented along said second path for focusing said one beam pulse with respect to said photomultiplier means; and
    a third lens means oriented along said third path for focusing said second beam pulse with respect to said photodiode means.

9. The apparatus as recited in claim 8 wherein said photodetector means provides a first output X indicative of said second harmonic emission of said one beam pulse, and said photodiode means provids a second output Y indicative of the fundamental power of said laser pulse, and further comprising
    means coupled to said first output X and said second output Y for providing a function (KX/Y2) indicative of the duration of said very short width semiconductor laser pulse,
    wherein K is a constant.

* * * * *